Figure 1:
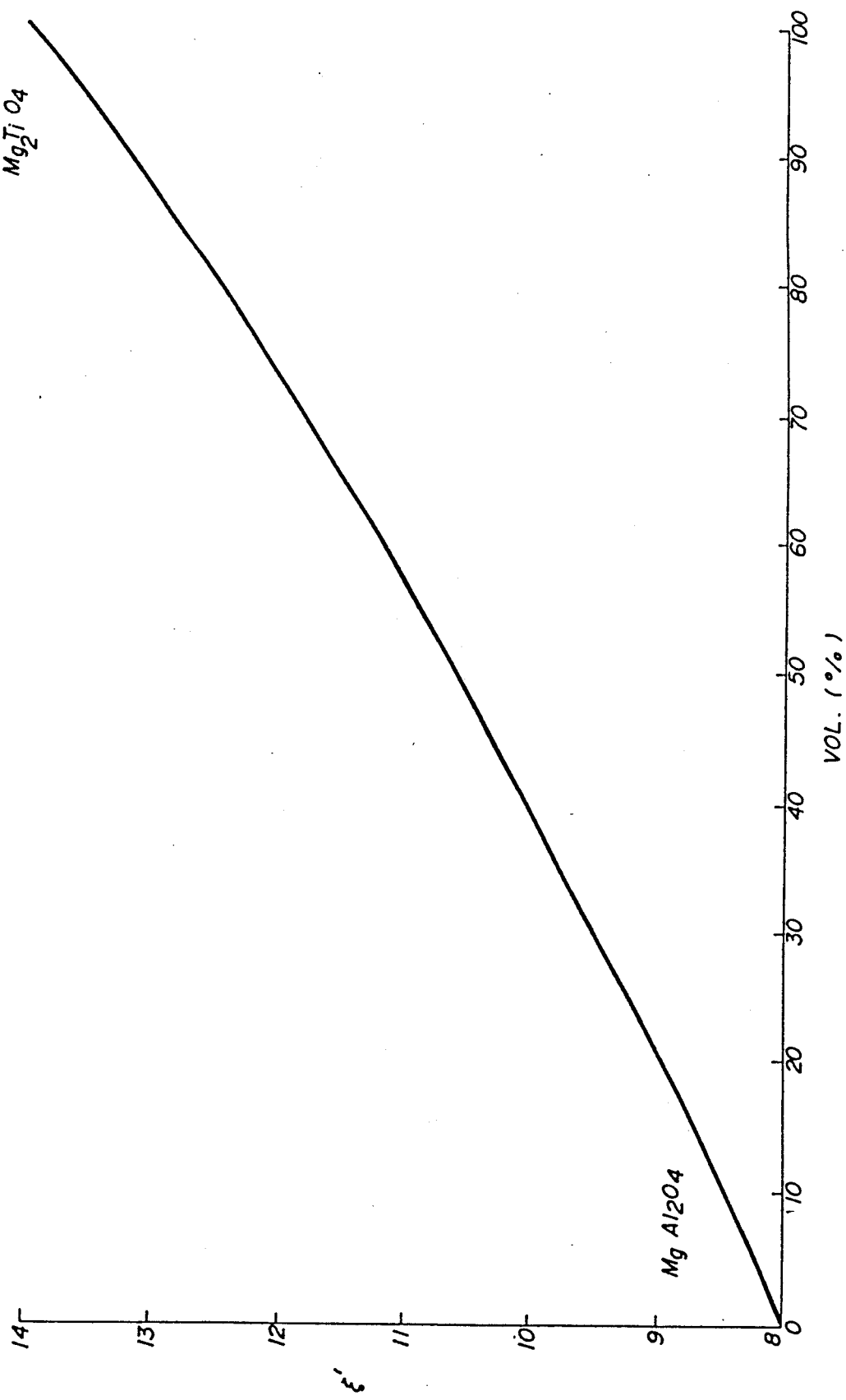

United States Patent [19]

Negas et al.

[11] Patent Number: 5,024,980
[45] Date of Patent: Jun. 18, 1991

[54] CERAMIC DIELECTRIC ALLOY

[75] Inventors: Taki Negas; Louis P. Dominques, both of Adamstown, Md.

[73] Assignee: Alpha Industries, Woburn, Mass.

[21] Appl. No.: 49,985

[22] Filed: May 15, 1987

[51] Int. Cl.$^5$ .............................................. C04B 35/46
[52] U.S. Cl. .................................... 501/134; 501/120; 501/135; 501/136
[58] Field of Search ................. 501/134, 135, 136, 120

[56] References Cited

U.S. PATENT DOCUMENTS

| | | | |
|---|---|---|---|
| 2,165,819 | 7/1939 | Albers-Schouberg | 501/136 |
| 2,305,327 | 12/1942 | Thurnauer | 501/136 |
| 2,328,410 | 8/1943 | Berge | 501/136 |
| 2,665,219 | 1/1954 | Thurnauer et al. | 501/136 |
| 2,691,088 | 10/1954 | Ungewiss | 501/136 |
| 2,741,561 | 4/1956 | Das Gupta | 501/136 |
| 3,990,902 | 11/1976 | Nishizawa et al. | 501/134 |
| 4,071,881 | 1/1978 | Bacher | 501/136 |
| 4,173,485 | 11/1979 | Woditsch et al. | 501/136 |
| 4,304,603 | 12/1981 | Grossman et al. | 501/136 |
| 4,307,198 | 12/1981 | Oda et al. | 501/136 |
| 4,308,570 | 12/1981 | Burn | 501/136 |
| 4,716,391 | 12/1987 | Moutrie et al. | 333/222 |

Primary Examiner—Mark L. Bell
Assistant Examiner—Anthony J. Green
Attorney, Agent, or Firm—Armstrong, Nikaido, Marmelstein, Kubovcik & Murray

[57] ABSTRACT

A method of fine-tuning the dielectric constant value of an insulating ceramic alloy, and the resulting alloy, and uses thereof, are disclosed. The alloy has the general formula:

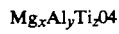

$$Mg_xAl_yTi_zO_4$$

wherein
$x+y+z=3$
$x=1-2$
$y=0.1-1.9$
$z=0.1-0.9$ and can be made from 10 to 90 mol percent of magnesium titanate and 90 to 10 mol percent of magnesium aluminate. The mol ratio of the titanate to the aluminate in the alloy is varied in order to vary the value of the dielectric constant of the alloy.

The alloy can be used in applications such as a dielectric plate for ceramic filters for cellular telephones.

2 Claims, 1 Drawing Sheet

CERAMIC DIELECTRIC ALLOY

FIELD OF THE INVENTION

The present invention relates to insulating ceramic alloys and methods for making the same.

BACKGROUND OF THE INVENTION

Ceramic dielectric materials have been known for an extended period of time, and have been widely used as electrical insulators in various electrical devices. A typical, widely used insulator is alumina, which generally has a dielectric constant of 9 to 9.9. Alumina has a high firing temperature, in the order of 1550° C., and is difficult to machine due to a hardness of approximately 9. Oxides of titanium have been added to alumina to soften the alumina, with the resulting material becoming a composite, which leads to other problems.

Oda et al U.S. Pat. No. 4,307,198 discloses low-expansion ceramics having a chemical composition of 2-20 wt % of magnesia (MgO), 10-68 wt % of alumina ($Al_2O_3$) and 30-80 wt % of titania ($TiO_2$), wherein the major component of the crystalline phase is magnesium-aluminum-titanate phase. These ceramics are made by mixing magnesia, magnesium carbonate and/or magnesium hydroxide; alumina and/or aluminum hydroxide; and anatase-and/or rutile-type titanium dioxide; adding a plasticizer, if necessary to form a shapeable mass; shaping the mass by extrusion, pressing, slip casting or injection molding; drying the shaped body; and firing at 1300° to 1700° C. These low-expansion ceramics are taught to be useful in fields where heat-resistance, thermal shock-resistance, wear-resistance, and corrosion-resistance are required. More particularly, the ceramics are taught to be useful as substrates for automobile exhaust gas purification catalysts; filters for diesel exhaust particulates; industrial or automotive ceramic heat exchangers; engine parts such as, pistons, cylinder liners, combustion chambers, auxiliary combustion chambers, turbo-charger rotors or the like; gas turbine parts such as nozzles, rotors, shrouds, scrolls, plenum, burner tail cylinders or the like; heat resistant ceramic materials for receivers of solar energy; refractory materials; and chinawares and porcelains for the chemical industries. There is no disclosure as to the electrical insulating properties of these ceramics.

Albers-Schonberg U.S. Pat. No. 2,165,819 discloses the use of magnesium titanate as an electrical insulator. Berge U.S. Pat. No. 2,328,410, Ungewiss U.S. Pat. No. 2,691,088 and Thurnauer U.S. Pat. No. 2,665,219 all disclose magnesium titanate ceramic insulators.

Woditsch U.S. Pat. No. 4,173,485 discloses the preparation of zinc and/or alkaline earth titanates, which may be doped with aluminum, phosphorous, boron and/or silicon, for use as white pigments in lacquers, plastics and paper, and as ferro-electrics. In particular, as shown in Example 2, a pigment of magnesium titanate doped with aluminum may be formed in accordance with the disclosed process.

Das Gupta U.S. Pat. No. 2,741,561 discloses a composition, having little if any variance of dielectric constant with change in temperature, based upon $Ca_2TiO_3$, $Mg_2TiO_4$, plus $ZrO_2$ and clay additions.

"Phase Diagrams for Ceramists", 1964 supplement, Levin and McMurdie, published by the American Ceramic Society Inc., 1964, at page 247 presents a phase diagram for the system $MgO$—$Al_2O$—$TiO_2$, with the indication that between $MgAl_2O_4$ and $Mg_2TiO_4$ solid solutions are obtained.

SUMMARY OF THE INVENTION

The present invention is directed to an insulating ceramic alloy of the formula:

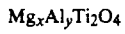

$$Mg_xAl_yTi_zO_4$$

wherein
  $x+y+z=3$
  $x=1-2$
  $y=0.1-1.9$
  $z=0.1-0.9$

The alloy has a dielectric constant which is in the ranges of 8.5-12.0 and 12.4-13.8, and a particular dielectric constant value within those ranges can be adjusted by changing the ratios of the starting components of the alloy. The alloy has a consistant, low dielectric loss, generally on the order of less than 0.0001 tan $\Delta$ (or, expressed otherwise, of greater than a quality factor Q of 10,000), measured at 10 GHz. The present invention permits the dielectric constant values of the alloy to be fine tuned, and the temperature coefficients of the dielectric constant ($T_k(^0C^{-1})$) are rather flat, with little variation, and generally near $+100$ ppm. The alloy is readily machineable and the final dielectric material made from the alloy can be produced with lower firing temperatures than alumina or other dielectrics. The alloy exhibits less corrosion sensitivity than previous dielectrics, and is relatively cheap to produce.

DETAILS OF THE INVENTION

The alloy of the present invention may be produced by alloying magnesium aluminate ($MgAl_2O_4$) and magnesium titanate ($Mg_2TiO_4$).

The ceramic products of the present invention are produced by simply mixing magnesium aluminate and magnesium titanate, in finely divided form, in the proportions indicated in FIG. 1 to produce the desired dielectric constant value. The mixture is then presintered at 1050° to 1250° C., preferably about 1200° C., to initiate reactions among the raw materials, and then milled to reduce particle size to an average particle size of 1 to 5 microns, preferably 1 to 2 microns, and then the milled product is shaped and dried and fired to form a single phase alloy. Typically the firing temperatures are in the range of 1325° to 1450° C., and preferablly 1400° to 1425° C., generally under atmospheric pressure, with the alloy generally being fired in air.

The drying is conducted after mixing and after milling, and can be conducted at any temperature between room temperature and the firing temperature, and even lower temperatures than room temperature can be used if the shaped mixture is placed under vacuum.

As will be clear to those of ordinary skill in this art, the alloys can be produced by alternative methods. For instance, suitable proportions of magnesia, alumina and an oxide of titanium, such as titanium dioxide, can be mixed together and then fired at the same temperatures as above. It is preferred that suitable proportions of magnesium oxide, aluminum oxide and titanium oxide, or oxide precursors, such as carbonates or the like, are mixed together in the proportions indicated to be suitable in FIG. 1, and presintered, milled, shaped, dried and fired under the same conditions as described above.

A particularly advantageous, densified alloy is disclosed in a copending application filed on even date herewith by Taki Negas and Louis Domingus entitled "Dense Ceramic Alloys and Process of Making Same", the disclosure of which is hereby incorporated by reference.

The relative proportions of the magnesium aluminate and the magnesium titanate (or of other starting components) can be readily determined from examination of the accompanying FIG. 1, which indicates the volume percentage of magnesium titanate required in the alloy for a given dielectric constant value between 8 and 14. As will be readily noted from FIG. 1, for instance, a magnesium titanate volume percentage of 30 produces an alloy having a dielectric constant of 9.5, a proportion of 50 volume percent of magnesium titanate produces a dielectric constant value of the alloy of 10.6, 60% magnesium titanate in the alloy produces a dielectric constant of 11.2, and 80% of magnesium titanate produces a dielectric constant of 12.5. When magnesium oxide, aluminum oxide and titanium oxide, or oxide precursors, are utilized, the relative proportions of the different metal oxides or metal oxide precursors, can be readily determined from FIG. 1.

The resulting alloys are pure, single phase ceramic dielectric materials suitable for use in microwave applications. The alloys exhibit a very uniform micro-structure due to the single phase nature of the alloys and are suitable for use whenever a very low loss and stable dielectric material is required. Typical alloys exhibit the following properties:

| Dielectric* Constant | Dielectric* Loss Tangent tan | Density (g/cm$^3$) | Temp. Coef. of Dielectric $T_K$(°C.$^1$) |
|---|---|---|---|
| 9 ± 0.3 | .00015 | 3.46 | +100 × 10$^{-6}$ |
| 9.5 ± 0.3 | .00015 | 3.46 | +100 × 10$^{-6}$ |
| 10 ± 0.3 | .00015 | 3.46 | +100 × 10$^{-6}$ |
| 11 ± 0.3 | .00015 | 3.45 | +100 × 10$^{-6}$ |
| 12 ± 0.3 | .00015 | 3.45 | +100 × 10$^{-6}$ |
| 13 ± 0.3 | .00015 | 3.44 | +100 × 10$^{-6}$ |
| 14 ± 0.3 | .00015 | 3.44 | +100 × 10$^{-6}$ |

*Measured @ GHz

The general properties of this series of alloys include the following:

| | |
|---|---|
| Water Absorption-% | Nil |
| Color | Cream |
| Thermal Conductivity-Cal./cm$^2$/cm/sec./°C. | 0.025 |
| Hardness-Mohs' Scale | 7 |
| Coefficient of Thermal Expansion-per°C. 20° C. to 300° C. | 7.5 × 10$^{-6}$ |

In addition to permitting the specific dielectric constant value to be fine-tuned into the product, the present invention results in the production of products which are somewhat less temperature dependent than existing commercial dielectric products. Furthermore, the coefficient of thermal expansion of the alloy of the present invention is generally lower than for similar competitive commercial products but higher than alumina. The alloy composition can be fired at firing temperatures in the order of 1400° C., which is substantially lower than that of existing alumina dielectric products having comparable dielectric constant values. The alloy of the present invention machines very well, as opposed to the extremely hard alumina competitive dielectric product.

The alloy of the present invention may be modified by minor additions of other conventional additives, such as, for example, calcium oxide which increases the toughness of the resulting alloy, thereby resisting any tendency of crystals to fall out of the fired product.

The alloys of the present invention are suitable for use as a dielectric plate for ceramic filters for cellular telephones, and for a matching dielectric for a phase shifter device.

The alloys of the present invention normally have a fired density which is less than 3.47 g/cm$^3$, and generally within the range of 3.40 to 3.45 g/cm$^3$.

EXAMPLE 1

This example relates to a process for producing a dielectric ceramic material having a dielectric constant of 12.2.

13.5369 kg of magnesium oxide (Maglite K of Merckoin and Co., 94.5% pure), 11.4528 kg of titanium dioxide (N.L.I. 3030, 99.5% pure) and 5.0103 kg of aluminum oxide (Alcoa Al6, 99.5% pure) were added to 30 liters of distilled water in a mixing tank, with a Cowles dispenser operating at 800 rpm until all materials had been added. The mixed materials were then mixed for one hour at 1300 rpm, and the resulting slurry was dried overnight at 550° F. in pans. The dried material was passed through a 10 mesh sieve, and the material passing through the sieve was presintered at 1200° C. for 8 hours in air. The presintered material was added to 30 liters of distilled water in a porcelain ball mill loaded to one-half volume with one-half inch high density alumina cylinders, and milled for six hours. The milled slurry was dried overnight at 550° F. in pans.

A binder solution was prepared from 0.50 weight percent of polyvinyl alcohol (Dupont 75-15), 0.05 weight percent of Methocel (Dow Chemical K15MDGS) and 0.50 weight percent of polyethylene glycol (Union Carbide 3350), with all weights being based upon the weight of the dried powder. The binder solution was passed through a 100 mesh stainless steel sieve. An amount of distilled water equal to the weight of the dried powder was placed in a mixing tank having a Cowles dispenser, the powder was then added to the mixing tank in small quantities, and thereafter the binder solution was added to the mixing tank slurry. The material in the mixing tank was mixed for one hour at 1300 rpm, and the resulting slurry was passed through a 200 mesh sieve and then spray dried under the following conditions:

| | |
|---|---|
| inlet temperature: | 350° C. |
| outlet temperature: | 125°C. |
| air pressure: | 26 psi |
| pump pressure: | 20 psi |

The resulting powder had a bulk density of 0.85 g/cm$^3$, with about 65% of the spray dried powder having a particle size between 140 and 270 mesh. Spray dried powder was pressed into the desired shapes at 6,000 psi, producing a product with a pressed density of 2.5 g/cm$^3$, and then fired in air under atmospheric conditions at a temperature of 1410° C. for ten hours. The resulting material had a fired density of 3.45 g/cm$^3$, a dielectric constant of 12.3±0.2, and a dielectric loss tangent of 0.0001.

EXAMPLE 2

This example relates to a process for producing a dielectric ceramic material having a dielectric constant of 9.9.

55.1921 weight percent of aluminum oxide, 32.8712 weight percent of magnesium oxide, 11.3617 weight percent of titanium dioxide, and 0.5750 weight percent of calcium oxide were subjected to the same treatment as in Example except the milling was conducted for two and one-half hours. The resulting dielectric material had a dielectric constant of 9.9±0.2 and a fired density of 3.45 g/cm$^3$.

EXAMPLE 3

This example relates to a process for producing a dielectric ceramic material having a dielectric constant of 9.9.

52.2677 weight percent of aluminumoxide, 34.0261 weight percent of magnesium oxide, 13.2427 weight percent of titanium dioxide, and 0.4635 weight percent of calcium titanate were processed in accordance with the procedure of Example 1 to produce a fired product having a dielectric constant of 9.9±0.2, a dielectric loss tangent of 0.0001 and a fired density of 3.45 g/cm$^3$.

EXAMPLE 4

This example relates to a process for producing a dielectric ceramic material having a dielectric constant of 9.5.

54.4236 weight percent of aluminum oxide of aluminum oxide, 32.7551 weight percent of magnesium oxide, 10.3547 weight percent of titanium dioxide, and 0.4667 weight percent of calcium titanate were mixed together and treated in accordance with the procedure of Example 1, to produce a fired product which had a dielectric constant of 9.5±0.2, with a fired density of 3.42 g/cm$^3$.

EXAMPLE 5

This example relates to a process for producing a dielectric ceramic material having a dielectric constant of 12.0.

45.1229 weight percent of magnesium oxide, 37.1761 weight percent of titanium dioxide, and 16.7011 weight percent of aluminum oxide were processed according to the procedure of Example 1, yielding a fired product having a dielectric constant of 12.0±0.2, and a fired density of 3.45 g/cm$^3$.

EXAMPLE 6

This example relates to a process for producing a dielectric ceramic material having a dielectric constant of 13.0.

47.3036 weight percent of magnesium oxide, 43.1347 weight percent of titanium dioxide, and 9.5616 weight percent of aluminum oxide were processed according to the procedures of Example 1, yielding a fired product having a dielectric constant of 13.0±0.2, and a fired density of 3.45 g/cm$^3$.

EXAMPLE 7

This example relates to a process for producing a dielectric ceramic material having a dielectric constant of 10.0.

43.2414 weight percent of aluminum oxide, 37.0152 weight percent of magnesium oxide, and 19.7407 weight percent of titanium dioxide were mixed together and otherwise processed in accordance with the procedures of Example 1, yielding a fired product having a dielectric constant of 10.0±0.2, and a fired density of 3.45 g/cm$^3$.

EXAMPLE 8

This example relates to a process for producing a dielectric ceramic material having a dielectric constant of 12.6.

46.0726 weight percent of magnesium oxide, 40.3356 weight percent of titanium dioxide, and 13.5918 weight percent of aluminum oxide were processed according to the procedure of Example 1, yielding a fired product having a dielectric constant of 12.6±0.2, and a fired density of 3.45 g/cm$^3$.

EXAMPLE 9

This example relates to a process for producing a dielectric ceramic material having a dielectric constant of 11.0.

38.7465 weight percent of magnesium oxide, 36.8333 weight percent of aluminum oxide, 23.9684 weight percent of titanium oxide, and 0.4518 weight percent of calcium titanate were mixed together in accordance with the procedures of Example 1, producing a fired product having a dielectric constant of 11.0±0.2, and a fired density of 3.45 g/cm$^3$.

We claim:

1. A method of fine-tuning the dielectric constant value of an insulating sinterd ceramic alloy, said method comprising making an insulating, sintered ceramic alloy from 10 to 90 mol % of magnesium titanate and 90 to 10 mol % of magnesium aluminate, or from corresponding amounts of magnesium oxide or oxide precursor, titanium oxide or oxide precursor, and aluminum oxide or oxide precursor, and varying the mol ratio of the titanate to the aluminum, or of the corresponding metal oxides or oxide precursors, in order to vary the value of the dielectric constant of the alloy.

2. A cellular telephone ceramic filter dielectric plate made of a single phase sinterd ceramic dielectric alloy consisting essentially of an alloy of the formula:

$$Mg_xAl_yTi_zO_4$$

wherein:
 $x+y+z=3$
 $x=1-2$
 $y=0.1-1.9$
 $z=0.1-0.9$ and having a dielectric constant within the range of 8.5 to 13.8.

* * * * *